United States Patent
Regueiro

[11] 3,945,365
[45] Mar. 23, 1976

[54] LOW EMISSION COMBUSTION SYSTEM FOR INTERNAL COMBUSTION ENGINE USING MULTIPLE SPARK

[75] Inventor: Jose F. Regueiro, Muskegon, Mich.

[73] Assignee: Teledyne Industries, Inc., Los Angeles, Calif.

[22] Filed: May 16, 1974

[21] Appl. No.: 470,407

[52] U.S. Cl.......... 123/191; 123/32 ST; 123/DIG. 4; 123/32 SP; 123/148 DS
[51] Int. Cl.² .................................... F02B 19/10
[58] Field of Search.......... 123/30 C, 32 ST, 32 SA, 123/32 SP, DIG. 4, 32 MS, 148 C, 191 S, 191 SP, 75 B, 148 DS

[56] References Cited
UNITED STATES PATENTS

| | | | |
|---|---|---|---|
| 1,599,354 | 9/1926 | Arnold | 123/32 MS |
| 1,722,145 | 7/1929 | Hermann | 123/32 MS |
| 1,847,612 | 3/1932 | Horning | 123/32 MS |
| 1,913,310 | 6/1933 | Moore | 123/32 MS |
| 2,121,920 | 6/1938 | Mallory | 123/32 ST |
| 3,776,212 | 12/1973 | Karlowitz | 123/32 ST X |

FOREIGN PATENTS OR APPLICATIONS

| | | | |
|---|---|---|---|
| 1,242,594 | 11/1971 | United Kingdom | 123/32 MS |
| 612,150 | 1/1961 | Canada | 123/191 S |

Primary Examiner—Wendell E. Burns
Assistant Examiner—William C. Anderson
Attorney, Agent, or Firm—Gifford, Chandler & Sheridan

[57] ABSTRACT

A system capable of accommodating extremely lean mixtures and operating with greatly reduced engine emissions and good fuel consumption. The system is applicable to "L" head, "F" head and "OHV" engines. A combustion chamber is used which encloses at a broad end a deep pocket offset from the cylinder and in which at least part of one valve is disposed. A narrow shallow end of the combustion chamber lies directly above the piston and is surrounded on three sides by a narrow but long squish area. No restriction exists between the two portions of the chamber. A first spark plug is disposed to fire into the chamber at a point in the narrow end of the chamber overlying the piston. A second spark plug fires into the chamber at a point spaced from the cylinder but adjacent the valves, in or near the broad end of the chamber. Means are provided to produce sequential firing of the spark plugs.

19 Claims, 7 Drawing Figures

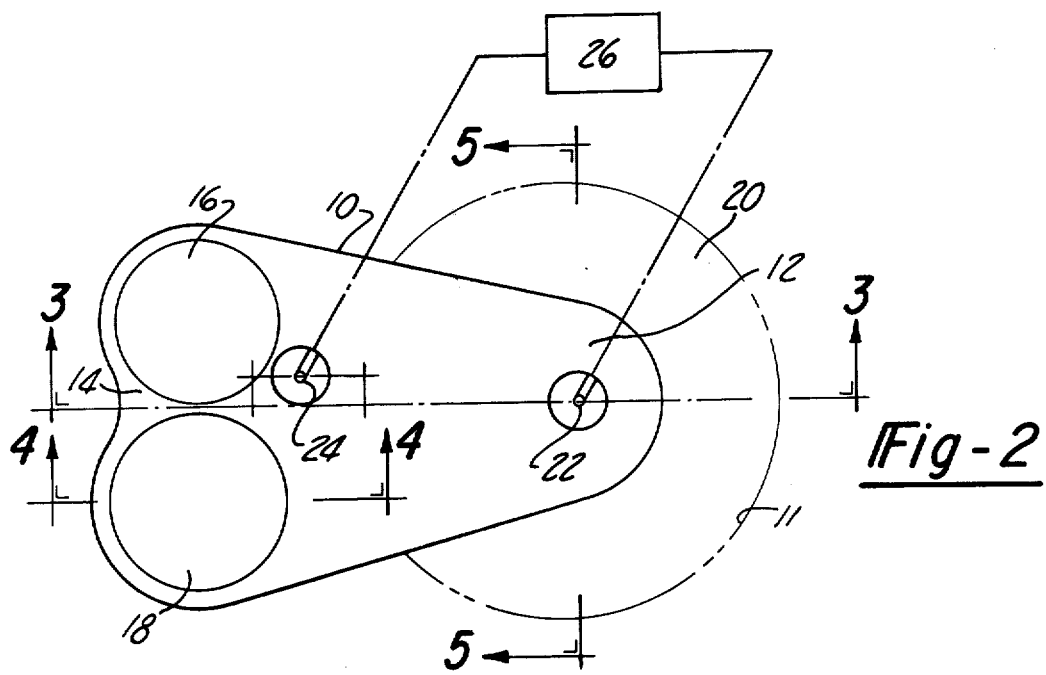
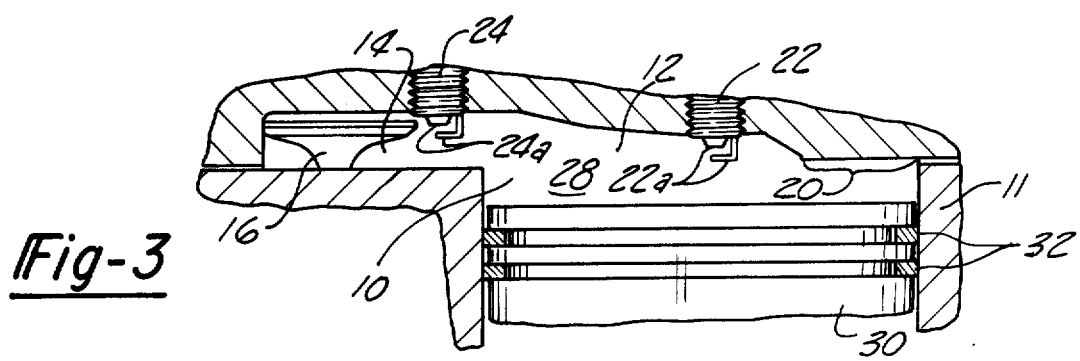
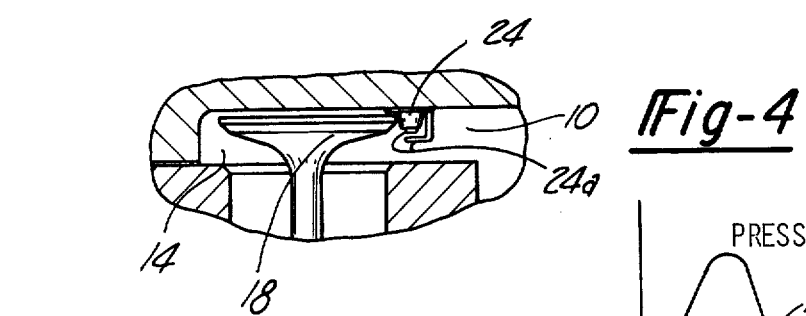
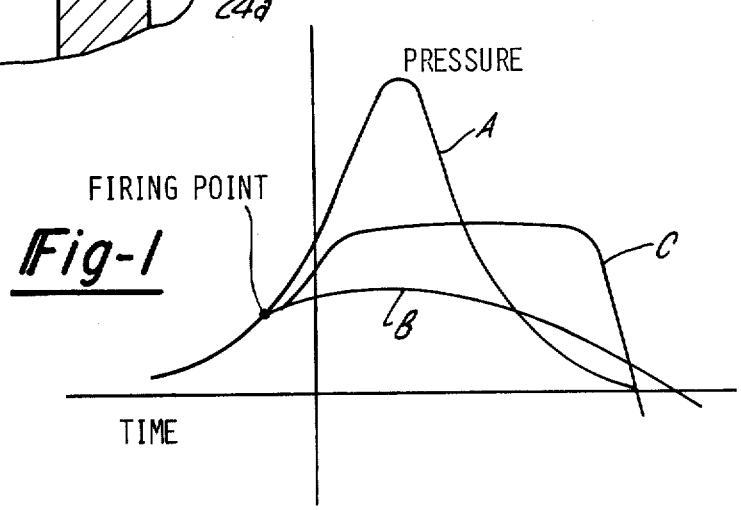

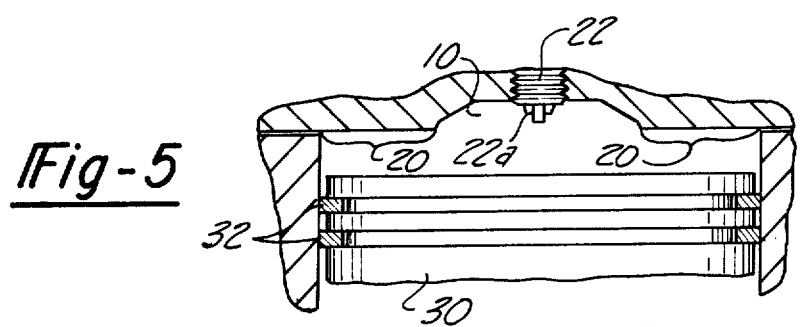
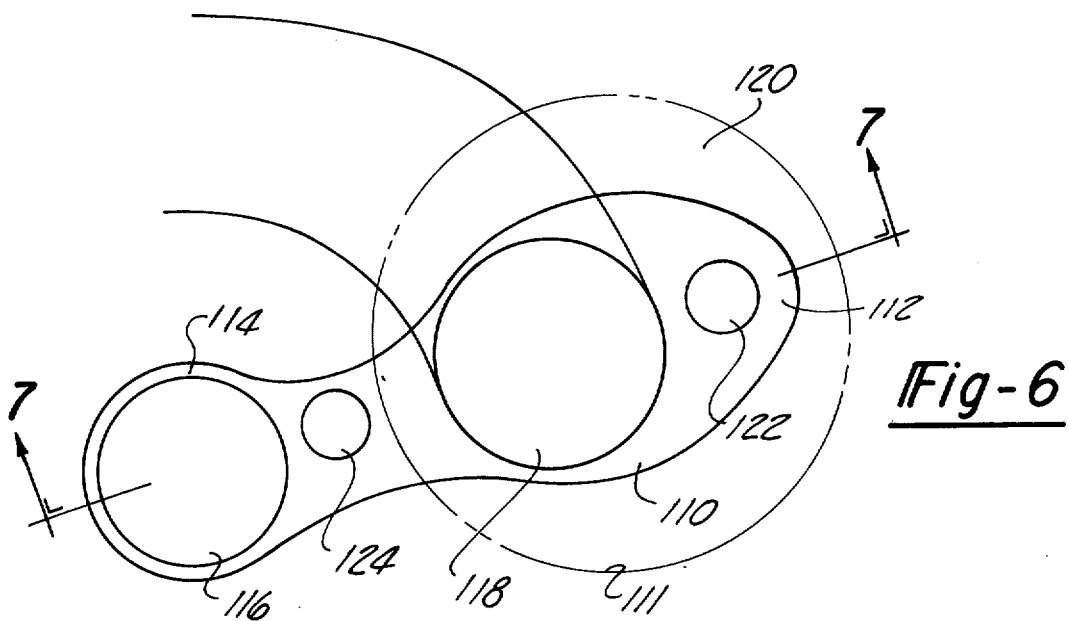
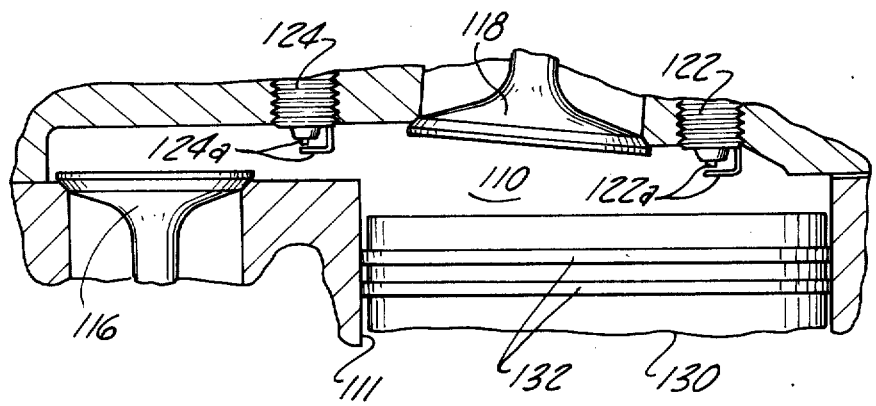

3,945,365

LOW EMISSION COMBUSTION SYSTEM FOR INTERNAL COMBUSTION ENGINE USING MULTIPLE SPARK

BACKGROUND OF THE INVENTION

The present invention relates to a combustion system for internal combustion engines which is capable of operating in the extreme lean air/fuel ratio range. The use of lean air/fuel ratios makes possible the reduction of carbon monoxide emissions to near zero levels. Moderately lean operation up to 18:1 air/fuel ratio is undesirable because of the very high emissions of oxides of nitrogen ($NO_x$) in this range. Although hydrocarbon emissions respond favorably to lean operation, most open chamber Otto engines start misfiring at ratios above 18:1 with resultant increase in hydrocarbon emissions. Misfire, of course, can also destroy an engine. The problem, then, becomes one of extending the misfire limit well into the extremely lean air/fuel ratios above 21:1 or 22:1 to create a comfortable operational range at ratios satisfactory to low values of all three major pollutants.

Although many efforts have been made to extend the lean misfire limit for open chamber Otto engines into the extreme lean region around 22:1, few have ever succeeded except in single cylinder laboratory engines.

The present invention includes a novel combustion chamber and igniting means system which utilizes and enhances the typically large unidirectional turbulence of combustion chambers with a side "pocket", to achieve not only positive ignition of extremely lean mixtures but also very fast combustion heretofore unachievable with either lean mixtures or retarded spark. This system utilizes both the lean mixtures and the retarded ignition and yet achieves fast combustion. In general, combustion with this system can best be described as controlled constant pressure combustion. The compression ratio is maintained as high as possible in accordance with the teachings of the present invention. The ignition timing is relatively late, in some cases starting even after the piston has passed TDC (top dead center). In this fashion, no combustion-generated negative pressures are exerted on the piston, but the maximum cylinder pressures are reduced considerably; and the time of their occurrence (in degrees) is somewhat later than in a conventional combustion system.

Combustion as described above results in direct reductions in $NO_x$ and HC emissions; but, in order to achieve improved fuel consumption without exhaust temperature deterioration, combustion, once established, must progress very fast so that the combustion pressures are exerted on the piston on the first 45° of crankshaft movement as the piston moves down during the expansion stroke.

The combustion system described herein achieves the above explained results as follows:

1. Positive ignition of the mixture, even under lean conditions, is achieved by firing the spark plug which is strategically located above the piston, resulting not only from the natural motion of the gases from the piston onto the side chamber but very specifically from the rather large squish area surrounding this plug on three sides. This could be called primary ignition, or ignition by the leading plug.

2. Once ignition is assured by the firing of the first spark plug, the cylinder pressure and temperature start to increase. The high degree of turbulence still present in the chamber is further increased in the direction away from the already fired spark plug and towards the second spark plug located near or within what could be called the main chamber. Combustion from the first spark plug is, however, somewhat controlled by the relatively low ignitable mass which in essence surrounds this plug, as well as by the rather shallow depth of the chamber formed between the upper portion of the piston and the cylinder head at this point in time (near TDC).

3. Ignition of the main charge follows that of the primary charge (primary ignition) by a number of crankshaft degrees. This ignition of the main charge could be called main or secondary ignition. Since the secondary or trailing plug fires in a highly turbulent environment, under higher pressures and temperatures than those to which a single plug cylinder is normally exposed, it is able to ignite the main charge under conditions otherwise impossible were this second plug to be the only source of ignition. From the moment that this trailing plug fires and secondary combustion starts, it proceeds very fast, not only because of the already mentioned favorable environment but because of the relatively compact and deeper portion of the chamber in the side pocket. But yet, the maximum cylinder pressure and temperature are kept under control, both because of the large amount of excess air present being intimately mixed with the products of combustion due to the highly turbulent combustion and because the piston is already on its downward stroke. This is how the $NO_x$ is kept under control.

The inherently large transfer of compressed mixture and/or combustion products to and from the cylinder and the side pocket traditional with "L" head designs, for example, is greatly minimized since a large portion of the actual combustion occurs on top of the piston. This reduction in pumping losses also helps to reduce the fuel consumption. The pumping losses are also reduced by the lowered manifold vacuums at which this engine operates.

The system, in accordance with the present invention, provides a novel approach to improving the brake specific fuel consumption, while at the same time decreasing all three major gaseous pollutants, reducing noise, reducing mechanical and thermal stresses, providing for fast starts even under cold conditions and in general resulting in very smooth operation.

The present invention is thus directed to a system for controlling the combustion rate in an internal combustion engine by reason of the shape and volume of the combustion chamber at several critical points and by the increased turbulence created by the final squish as the piston nears top dead center (TDC). To provide the critical control of $NO_x$ emissions, timing as between the firing of the two spark plugs will be relatively late. For internal combustion engines not requiring an extreme degree of $NO_x$ control, the timing can be advanced somewhat to improve power and fuel consumption. A major and outstanding advantage of the system is its control over $NO_x$ and other emissions through proper combustion chamber design, the use of extremely lean air/fuel ratios and the proper control of the spark timing on either plug. Additional advantages are that fuel consumption at peak load is greatly reduced by more complete fuel utilization and there is increased engine mechanical efficiency resulting from reduced pumping losses and friction. For the same speed and shaft horsepower with the lean mixtures, lower manifold vacuums result. This reduces the pumping losses, increases the mechanical efficiency and lowers the fuel consumption. It should be noted that the reduced manifold vacuums operate to reduce oil consumption for the engine.

SUMMARY OF THE INVENTION

The present invention thus relates to an improved combustion system capable of utilizing a lean fuel/air mixture and further capable of drastically reducing noxious emissions, particularly $NO_x$ emissions. The improvement arises from the combination of a combustion chamber of convergent shape, a pair of spaced spark plugs placed near the convergent end and near the divergent end of the chamber, along with a substantial squish area provided adjacent the plug in the convergent end of the chamber.

In the operation of the present invention, a pressure peak, as will be explained hereinafter, is substantially avoided and a good integrated pressure-time curve is obtained. By the reduction of peak temperature and peak pressure, the oxides of nitrogen are substantially reduced and the engine operates in a quieter manner and with a longer life period.

Hydrocarbon emissions are also reduced by the presence of excessive air, the large turbulence and late ignition timing allowing full penetration of the flame front to all the confines of the chamber. Carbon monoxide emissions are practically eliminated by the very lean mixtures. Improved fuel economy results from thorough utilization of the fuel and a drastically different cylinder pressure-time curve practically devoid of negative pressure areas (improved mechanical efficiency).

BRIEF DESCRIPTION OF THE DRAWINGS

The present invention will be explained in the accompanying specification and with reference to the drawings in which like numerals are used to refer to like elements shown in the several views, and in which:

FIG. 1 is a graph of pressure plotted against time illustrating the operation of the present invention as compared to prior art internal combustion engines;

FIG. 2 is a top plan view showing the basic parts of the combustion system and the configuration of the combustion chamber;

FIG. 3 is a sectional view taken along the lines 3—3 of FIG. 2 with parts broken away;

FIG. 4 is a fragmentary sectional view taken along the lines 4—4 of FIG. 2;

FIG. 5 is a sectional view taken along the lines 5—5 of FIG. 2;

FIG. 6 is a view similar to FIG. 2 but illustrating another embodiment of the present invention; and FIG. 7 is a view taken substantially on line 7—7 of FIG. 6.

DETAILED DESCRIPTION OF THE INVENTION

With reference to the graph of FIG. 1, it shows the normal pressure curve for a typical internal combustion engine on line A. Line B shows the same engine operating with a retarded spark. It will be seen that there is no pressure peak but a pressure which deteriorates. The operation of the combustion system of the present invention is represented by line C, which shows a pressure curve without a high peak pressure but rather with a well integrated pressure-time characteristic. This operating characteristic is extremely important since reduction of peak temperature and peak pressure has the effect of greatly reducing the oxides of nitrogen.

FIG. 2 shows the general shape and configuration of a preferred combustion chamber 10 as applied to an "L" head engine and includes a broad end 14 and a narrow end 12. Included in the broad end 14 are an exhaust valve 16 and an intake valve 18.

Also shown in FIG. 2 is the squish area 20 which will be further shown in FIG. 3. The combustion chamber 10 converges into the narrow end 12 which will be seen to overlie the upper end of the cylinder 11 for a purpose which will be explained hereinafter. A pair of igniting means, preferably spark plugs 22 and 24, are included. The spark plug 22 is positioned at the narrow end 12 of the combustion chamber 10. The second spark plug 24 is located at the left hand broad end 14 of the combustion chamber 10. An appropriate ignition control system 26 is included to provide for the controlled sequential firing of the spark plugs 22 and 24 in that order, with a lag between the firing of the two plugs presettable and variable by adjustment of the ignition control system 26. This sequential firing of the spark plugs 22 and 24 is important to properly ignite lean mixtures. In the interest of simplicity and brevity, the details of the ignition control system 26 are not included in this application.

While the combustion chamber 10 is illustrated with a particular divergent and convergent configuration, it should be understood that for the purpose of the present invention it is only necessary that the portion disposed over the cylinder 11 have a smaller volume than the portion adjacent the valves 16 and 18. Many configurations could be provided which will meet this requirement. Further, while the spark plugs 22 and 24 are illustrated at preferred positions, it should be clear that the spark plug 22 can be located in an area from the position shown to a position slightly past the center of the cylinder 11. The spark plug 24 can be disposed in the broad end of the chamber 10 in any position as long as it does not overlie the cylinder 11.

It will be understood that the spark plugs 22 and 24 are preferably of the long-reach type and are extended relatively far downwardly into the combustion chamber 10, as better shown in FIG. 3, without interferring with the operation of valves 16 and 18. The sequential firing of the spark plugs 22 and 24 is preferably for the second to be fired 4° to 8° crankshaft, after the first. A somewhat broader operable range may be defined as falling between 0° and 12° crankshaft, depending upon cylinder bore size and other characteristics of the engine.

FIG. 3 shows the general construction of the spark plugs 22 and 24 having electrodes 22a and 24a, respectively. The squish area, denoted by the numeral 20 and best illustrated in FIG. 5, is similarly shown in FIG. 3 which clarifies the sizing of the squish area, namely that it is of a high area to volume ratio and lies above the top of the cylinder 11 adjacent the combustionchamber 10. A piston 30 with associated piston rings 32 is shown in part as it moves upwardly toward top dead center position. It is significant that there is a relatively small distance provided between the top of the piston 30 and the top of the combustion chamber 10. The relatively small volume of the combustion chamber 10 at that point, surrounded by a large flat area comprising squish area 20, will operate to squish and force the mixture into the outer portion, that is the enlarged end 12 of the combustion chamber 10.

While the combustion chamber 10 is illustrated in FIG. 5 as being formed with relatively vertical sides, this is, of course, not necessary and the sides could, if desired, blend smoothly with curved shapes into the walls defining the upper section of the squish area 20. The upper section of the combustion chamber 10 does not necessarily have to be flat; it could be slightly curved or tapered to blend with either the flat portion of the squish area or extend all the way to the combustion chamber walls, or both combustion chamber and squish area could be combined in a series of composite curves allowing the combustion chamber to extend practically to the cylinder walls and disposing of the traditionally flat surfaces of the squish area, and yet, however, achieving nearly the same effect.

DESCRIPTION OF OPERATION

During part load operation, the induction of the air/fuel mixture and compression are effected in the normal manner. Around TDC (depending on engine design and operational load and speed), the spark plug 22 is actuated through the ignition control system 26. The spark plug 22 is preferably a hot plug with extended electrodes and a relatively wide gap. It is correctly positioned in both horizontal and vertical planes to initiate a positive start of combustion even with the extremely lean mixtures involved. This combination of spark plug characteristics and location, plus the very high turbulence produced by the high squish area 20, are sufficient to assure ignition. Once ignition is established, it progresses from right to left through the thin divergent section. The combustion rate is thus controlled on the one hand by the shape and volume of the combustion chamber 10 and on the other hand by the increased turbulence created by the final squish as the piston 30 nears TDC. The timing of the firing of the second spark plug 24 depends upon the engine design and the intended applications. For extremely efficient $NO_x$ control, the timing will be relatively late. For applications not requiring the same high degree of $NO_x$ control, timing can be somewhat advanced for improved power and better fuel economy. Both plugs 22 and 24 fire quite late as compared to conventional engines.

By operating as described above, the $NO_x$ control is almost completely achieved by the proper combination of engine design, extremely lean mixtures and the spark timing on the two spark plugs 22 and 24. As has already been indicated, there is resultant increased engine mechanical efficiency since, with the leaner mixtures, a lower manifold vacuum results. This reduces the pumping losses, increases the mechanical efficiency and lowers the fuel consumption. The reduced manifold vacuums also reduce oil consumption. With reduced manifold vacuums, less oil is sucked past the valve guides and piston rings 32.

FIGS. 6 and 7 illustrate the present invention embodied in an "F" head engine. In such an engine the intake valve 118 is actuated from above the combustion chamber 10, while the exhaust valve 116 is actuated from below.

As can best be seen in FIG. 6, the combustion chamber 110 is provided with an end 112 disposed over the cylinder 111 and an end 114 displaced from the cylinder 111. The exhaust valve 116 is disposed within the end 114 and the intake valve 118 is disposed within the end 112. The end 112 registers with a squish area 120.

A spark plug 122 is disposed within the end portion 112 overlying the cylinder 111 and a spark plug 124 is disposed within the end 114 of the combustion chamber 110 at a point spaced from the cylinder 111.

It is apparent that the construction shown in FIGS. 6 and 7 functions substantially identical to the engine shown in FIGS. 2–5. The spark plugs 122 and 124 are fired sequentially as indicated above and the end 112 of the combustion chamber 110 in combination with the squish area 120 provides a relatively high area to volume ratio chamber in registering with the end 114 of the combustion chamber 110.

Thus as described above, as the piston 130 approaches TDC, the squish area 120 will operate to force the mixture to the outer portion of the combustion chamber 110 and thus into the end 114 to, in combination with the sequential firing of spark plugs 122 and 124, produce combustion. The absence of negative pressure areas is also quite effective in increasing mechanical efficiency.

Full load operation at wide open throttle can be achieved with the present system in the same fashion as any part load condition with extremely lean mixtures of fuel/air without misfiring and with absolute control over the $NO_x$ emissions. Because of the reduced fuel flow associated with the lean mixtures, however, the same power levels obtained with an engine of conventional design cannot be achieved. To increase power, many solutions are available in connection with the present invention.

It is possible to provide increased engine displacement to solve the maximum power problem. However, this solution tends to increase the engine friction with attendant increases in fuel consumption and brake specific emissions. Detonation control provided is excellent.

Advanced timing on the second spark plug 22 may be used to increase the maximum power. At the same time, this tends to increase the $NO_x$ emissions, while decreasing the brake specific fuel consumption.

Maximum power under WOT conditions results in operation very similar to that of a conventional engine. The ignition timing is still retarded, but the dual ignition points, the sequential firing coupled with the high turbulence and the high compression combine to produce a fast enough combustion that more than compensates for the effective retarded ignition.

It will thus be seen that the combustion system according to the present invention provides an internal combustion engine which can be operated with extremely lean air/fuel ratios of the order of 20:1 and even higher, such as required for complete exhaust emissions control (hydrocarbon, carbon monoxide and nitrogen oxides), without regard to speed or load condition, while retaining near optimum values for brake specific fuel consumption.

An internal combustion engine constructed in accordance with the present invention is capable of operation with ready start, low mechanical stresses, low thermal stresses and relatively little fuel waste due to enrichment devices. Operation in the aforesaid lean limit with low exhaust temperatures further tends to extend the life of the exhaust system as follows: (a) less water is formed during combustion, such water attacks exhaust systems after reacting with the oxides of nitrogen and sulphur oxide to form highly corrosive nitric acid and sulphuric acid; (b) fewer oxides of nitrogen are produced to react with whatever water results from combustion and/or ambient humidity. The absence of the fuel rich mixtures and reduced oil consumption described above tend to extend the life of the spark plugs by preventing their fouling. The engine starts are faster and cleaner and there is a low hydrocarbon and carbon monoxide emission after start up due to solid engine operation in the lean region.

The internal combustion engine constructed and operated in accordance with the teachings of this invention is able to operate on a variety of fuels, including low-lead fuel, and there is a substantial reduction in the black smoke emissions and exhaust odors which are associated with fuel rich mixtures. Noise levels of combustion are also reduced.

It will thus be seen that I have provided by the present invention a substantially improved combustion system for internal combustion engines.

What is claimed is:

1. In an internal combustion engine having a cylinder and a piston therein, a reduced emission combustion system capable of accommodating a relatively lean air/fuel mixture comprising:
   a combustion chamber with a first end and a second end, a portion of the combustion chamber including the first end overlying the top of the cylinder and the second end spaced from the cylinder;
   said combustion chamber having an upper wall formed to provide an undivided combustion chamber at the top dead center of said piston,
   a squish area of relatively high area/volume ratio located above the top of the cylinder in registry with said first end of said combustion chamber of providing turbulence;
   an intake valve and an exhaust valve disposed in said combustion chamber;
   a first igniting means located proximate said first end of said combustion chamber;
   a second igniting means located proximate said second end of said combustion chamber;
   means for actuating said first igniting means and thereafter actuating said second igniting means;
   said igniting means each having an end extending into said combustion chamber, said ends being in a plane substantially normal to the axis of said cylinder; and
   means for introducing a relatively lean fuel/air mixture into said combustion chamber.

2. The combination as set forth in claim 1 wherein said intake valve and said exhaust valve are disposed in said second end of said combustion chamber and said second igniting means is fixed in a position proximate said valves.

3. The combination as set forth in claim 2 wherein said second igniting means is substantially equally spaced from said valves.

4. The combination as set forth in claim 1 in which there is a lag of between zero to twelve crankshaft degrees between the actuating of said first and said second igniting means.

5. The combination as set forth in claim 1 wherein said igniting means are actuated approximately four to eight crankshaft degrees apart.

6. The combination as defined in claim 1 and in which said fuel/air mixture is of the order of 1:20.

7. In an internal combustion engine having a cylinder and a piston therein, a reduced emission combustion system capable of accommodating a relatively lean air/fuel mixture comprising:
   a combustion chamber with a first end and a second end, a portion including the first end overlying the top of the cylinder and the second end spaced from the top of the cylinder;
   the second end of said combustion chamber having a greater volume than said first end;
   said combustion chamber having an upper wall formed to provide an undivided combustion chamber at top dead center of said piston;
   a squish area of relatively high area/volume ratio located above the top of the cylinder in registry with said first end of said combustion chamber for providing turbulence;
   an intake valve and an exhaust valve disposed in said combustion chamber;
   a first igniting means located proximate said first end of said combustion chamber;
   a second igniting means located proximate said second end of said combustion chamber;
   means for actuating said first igniting means and thereafter actuating said second igniting means; and
   means for introducing a relatively lean/air mixture into said combustion chamber.

8. The invention as defined in claim 7 and in which said actuating means actuates both of said igniting means before top dead center position of said piston.

9. The combination as set forth in claim 7 wherein said vales are disposed in said first end of said combustion chamber and said second igniting means is fixed in said first end of said chamber substantially equidistant from said valves.

10. The combination as set forth in claim 7 wherein said second igniting means is fixed in a position spaced from said valves.

11. The combination as set forth in claim 7 wherein there is a spacing ranging from zero to twelve crankshaft degrees between the actuating of said first and said second igniting means.

12. In an internal combustion engine having a cylinder and a piston therein, a low emission type combustion system comprising:
   a combustion chamber with a relatively broad end a relatively narrow end spaced therefrom, a portion of the narrow end of said chamber overlying the top of said cylinder;
   said combustion chamber having an upper wall formed to provide an undivided combustion chamber at top dead center of said piston,
   an intake valve and an exhaust valve disposed in the broad end of said combustion chamber,
   a first igniting means located proximate the narrow end of said combustion chamber and having a portion extending through said upper wall and into said combustion chamber;
   a second igniting means located proximate the broad end of said combustion chamber and having a portion extending through said upper wall and into said combustion chamber;
   means for introducing a relatively lean fuel/air mixture into said combustion chamber; and
   means for actuating said first igniting means and thereafter actuating said second igniting means.

13. The combination as set forth in claim 12 wherein said relatively lean air/fuel ratio provided to said chamber is substantially of the order of 20:1.

14. The combination as set forth in claim 12 wherein a squish area is located adjacent said narrow end of said chamber proximate said first igniting means.

15. The combination as set forth in claim 12 wherein said igniting means comprise spark plugs having extended electrodes and a relatively wide gap.

16. The combination as set forth in claim 15 wherein the timing of the firing of said second spark plug is relatively late relative to the firing of the first spark plug in order to substantially eliminate nitrogen oxide emissions during partial load operation of said engine.

17. In an internal combustion engine having a cylinder and a piston therein, a reduced emission combustion system for accommodating a relatively lean air/fuel mixture comprising:
   a combustion chamber with a first end and a second end, a portion of the combustion chamber including the second end overlying the top of the cylinder;
   a squish area of relatively high area/volume ratio located above the top of the cylinder adjacent said second end of said combustion chamber for providing turbulence;
   intake and exhaust means communicating with said combustion chamber, said intake means including means for delivering a relatively lean fuel/air mixture to said combustion chamber;
   a first igniting means located proximate said second end of said combustion chamber and a second igniting means spaced from said first igniting means; and
   means for actuating said first and second igniting means sequentially, both said igniting means actuated before top dead center position of said piston and being actuated at least four crankshaft degrees apart.

18. The engine as defined in claim 17 and in which the lag between the actuation of said first igniting means and the actuation of said second igniting means is not more than twelve crankshaft degrees.

19. The combination as defined in claim 1 and in which said first end is relatively broad and said second end is relatively narrow.

* * * * *

UNITED STATES PATENT OFFICE
CERTIFICATE OF CORRECTION

PATENT NO. : 3,945,365
DATED : March 23, 1976
INVENTOR(S) : Jose F. Regueiro

It is certified that error appears in the above-identified patent and that said Letters Patent are hereby corrected as shown below:

Col. 8, line 29, delete "vales"
and insert --valves--

Signed and Sealed this twenty-second Day of June 1976

[SEAL]

Attest:

RUTH C. MASON
Attesting Officer

C. MARSHALL DANN
Commissioner of Patents and Trademarks